(12) United States Patent
Rothstein et al.

(10) Patent No.: US 8,782,393 B1
(45) Date of Patent: Jul. 15, 2014

(54) ACCESSING SSL CONNECTION DATA BY A THIRD-PARTY

(75) Inventors: Jesse Abraham Rothstein, Seattle, WA (US); Arindum Mukerji, Seattle, WA (US); David D. Schmitt, Seattle, WA (US); John R. Hughes, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 777 days.

(21) Appl. No.: 11/420,677

(22) Filed: May 26, 2006

Related U.S. Application Data

(60) Provisional application No. 60/785,151, filed on Mar. 23, 2006.

(51) Int. Cl.
*G06F 21/00* (2013.01)

(52) U.S. Cl.
USPC ............. 713/151; 709/223; 709/225; 726/10; 726/12; 726/13; 705/75

(58) Field of Classification Search
USPC ........................................................ 713/151
See application file for complete search history.

(56) References Cited

U.S. PATENT DOCUMENTS

| | | | |
|---|---|---|---|
| 5,267,314 A | 11/1993 | Stambler | |
| 5,319,638 A | 6/1994 | Lin | |
| 5,412,730 A | 5/1995 | Jones | |
| 5,524,073 A | 6/1996 | Stambler | |
| 5,657,390 A * | 8/1997 | Elgamal et al. | 713/151 |
| 5,793,302 A | 8/1998 | Stambler | |
| 5,825,890 A | 10/1998 | Elgamal et al. | |
| 5,936,541 A | 8/1999 | Stambler | |
| 5,974,148 A | 10/1999 | Stambler | |
| 6,052,785 A | 4/2000 | Lin et al. | |
| 6,061,454 A | 5/2000 | malik et al. | |

(Continued)

FOREIGN PATENT DOCUMENTS

| | | |
|---|---|---|
| CN | 1615632 A | 5/2005 |
| EP | 1533982 A2 | 5/2005 |

(Continued)

OTHER PUBLICATIONS

AARNet: Network: Large MTU: Programming (www.aarnet.edu.au.engineering/networkdesign/mtu/programming.html), Dec. 9, 2005.

(Continued)

*Primary Examiner* — Mahfuzur Rahman
(74) *Attorney, Agent, or Firm* — John W. Branch; Lowe Graham Jones PLLC

(57) ABSTRACT

A method, system, and apparatus are directed towards enabling access to payload by a third-party sent over an SSL session. The third-party may be a proxy situated between a client and a server. SSL handshake messages are sent between the client and the server to establish the SSL connection. As the SSL handshake messages are routed through the proxy, the proxy may extract data. In addition, one of the client or the server may send another message within, or out-of-band to, the series of SSL handshake message directly to the proxy. The other SSL message may include secret data that the proxy may use to generate a session key for the SSL connection. With the session key, the proxy may receive SSL messages over the SSL connection, modify and/or transpose the payload within the received SSL messages, and/or terminate the SSL connection at the proxy.

12 Claims, 8 Drawing Sheets

(56) References Cited

U.S. PATENT DOCUMENTS

| | | | |
|---|---|---|---|
| 6,094,485 A | 7/2000 | Weinstein et al. | |
| 6,104,716 A | 8/2000 | Crichton et al. | |
| 6,105,067 A | 8/2000 | Batra | |
| 6,175,869 B1 | 1/2001 | Ahuja et al. | |
| 6,212,636 B1 | 4/2001 | Boyle et al. | |
| 6,223,287 B1 | 4/2001 | Douglas et al. | |
| 6,367,009 B1 | 4/2002 | Davis et al. | |
| 6,374,300 B2 * | 4/2002 | Masters | 709/229 |
| 6,526,131 B1 | 2/2003 | Zimmerman et al. | |
| 6,546,423 B1 | 4/2003 | Dutta et al. | |
| 6,584,567 B1 | 6/2003 | Bellwood et al. | |
| 6,643,701 B1 | 11/2003 | Aziz et al. | |
| 6,658,114 B1 | 12/2003 | Farn et al. | |
| 6,674,717 B1 | 1/2004 | Duong-van et al. | |
| 6,681,327 B1 | 1/2004 | Jardin | |
| 6,704,798 B1 | 3/2004 | Mogul | |
| 6,718,388 B1 | 4/2004 | Yarborough et al. | |
| 6,724,893 B1 | 4/2004 | Petro | |
| 6,728,884 B1 | 4/2004 | Lim | |
| 6,732,269 B1 | 5/2004 | Baskey et al. | |
| 6,751,677 B1 * | 6/2004 | Ilnicki et al. | 719/316 |
| 6,799,270 B1 | 9/2004 | Bull et al. | |
| 6,918,041 B1 | 7/2005 | Chen | |
| 6,996,841 B2 | 2/2006 | Kadyk et al. | |
| 7,007,163 B2 | 2/2006 | Tardo et al. | |
| 7,010,608 B2 | 3/2006 | Garg et al. | |
| 7,017,049 B2 | 3/2006 | Hand et al. | |
| 7,043,632 B2 | 5/2006 | Chapman et al. | |
| 7,073,066 B1 | 7/2006 | Nessett | |
| 7,082,535 B1 | 7/2006 | Norman et al. | |
| 7,120,666 B2 | 10/2006 | McCanne et al. | |
| 7,136,997 B2 | 11/2006 | Yamaguchi et al. | |
| 7,137,143 B2 | 11/2006 | Chawla et al. | |
| 7,142,676 B1 | 11/2006 | Hillier et al. | |
| 7,146,505 B1 | 12/2006 | Harada et al. | |
| 7,149,892 B2 | 12/2006 | Freed et al. | |
| 7,174,565 B2 | 2/2007 | Kadyk et al. | |
| 7,219,120 B2 | 5/2007 | Hui | |
| 7,222,234 B2 | 5/2007 | Martin et al. | |
| 7,240,366 B2 | 7/2007 | Buch et al. | |
| 7,249,377 B1 | 7/2007 | Lita et al. | |
| 7,254,237 B1 | 8/2007 | Jacobson et al. | |
| 7,269,659 B2 | 9/2007 | Kadyk et al. | |
| 7,293,034 B2 | 11/2007 | Paya et al. | |
| 7,318,100 B2 | 1/2008 | Demmer et al. | |
| 7,343,398 B1 | 3/2008 | Lownsbrough | |
| 7,370,015 B2 | 5/2008 | Gvily | |
| 7,370,351 B1 | 5/2008 | Ramachandran et al. | |
| 7,401,159 B1 | 7/2008 | Aviani et al. | |
| 7,421,735 B2 | 9/2008 | Kerstens et al. | |
| 7,430,755 B1 * | 9/2008 | Hughes et al. | 726/3 |
| 7,430,757 B1 | 9/2008 | Chari et al. | |
| 7,472,413 B1 | 12/2008 | Mowshowitz | |
| 7,493,383 B1 * | 2/2009 | Mukerji | 709/223 |
| 7,502,726 B2 | 3/2009 | Panasyuk et al. | |
| 7,506,368 B1 * | 3/2009 | Kersey et al. | 726/12 |
| 7,506,369 B2 | 3/2009 | Buch et al. | |
| 7,543,146 B1 | 6/2009 | Karandikar et al. | |
| 7,568,114 B1 | 7/2009 | Schlafly | |
| 7,584,505 B2 * | 9/2009 | Mondri et al. | 726/13 |
| 7,647,404 B2 | 1/2010 | Cooper et al. | |
| 7,661,131 B1 | 2/2010 | Shaw et al. | |
| 7,742,406 B1 | 6/2010 | Muppala | |
| 7,769,994 B2 * | 8/2010 | Peles | 713/153 |
| 7,770,007 B2 | 8/2010 | Bobde et al. | |
| 7,827,405 B2 | 11/2010 | Christiansen et al. | |
| 7,853,699 B2 | 12/2010 | Wu et al. | |
| 7,865,720 B2 | 1/2011 | Little et al. | |
| 7,890,751 B1 * | 2/2011 | Morris et al. | 713/156 |
| 7,895,446 B2 | 2/2011 | Harada et al. | |
| 7,904,949 B2 | 3/2011 | Bowers et al. | |
| 7,904,951 B1 | 3/2011 | Ebrahimi et al. | |
| 7,958,347 B1 | 6/2011 | Ferguson | |
| 7,979,555 B2 | 7/2011 | Rothstein et al. | |
| 7,984,160 B2 | 7/2011 | Lam | |
| 7,996,886 B1 | 8/2011 | Hughes et al. | |
| 8,001,371 B2 | 8/2011 | Langer | |
| 8,020,201 B2 | 9/2011 | Adusumilli et al. | |
| 8,176,186 B2 | 5/2012 | McCanne et al. | |
| 8,190,875 B2 | 5/2012 | Lev Ran et al. | |
| 8,225,085 B2 | 7/2012 | Karandikar | |
| 8,266,452 B2 | 9/2012 | Dunn et al. | |
| 8,478,986 B2 | 7/2013 | Merugu et al. | |
| 2001/0037387 A1 * | 11/2001 | Gilde et al. | 709/225 |
| 2001/0047474 A1 | 11/2001 | Takagi et al. | |
| 2002/0016911 A1 | 2/2002 | Chawla et al. | |
| 2002/0023145 A1 | 2/2002 | Orr et al. | |
| 2002/0035681 A1 * | 3/2002 | Maturana et al. | 713/151 |
| 2002/0062372 A1 * | 5/2002 | Hong et al. | 709/225 |
| 2002/0069241 A1 | 6/2002 | Narlikar et al. | |
| 2002/0112152 A1 * | 8/2002 | VanHeyningen et al. | 713/151 |
| 2002/0138551 A1 * | 9/2002 | Erickson | 709/203 |
| 2002/0157019 A1 | 10/2002 | Kadyk et al. | |
| 2002/0163884 A1 | 11/2002 | Peles et al. | |
| 2002/0165928 A1 | 11/2002 | Landfeldt et al. | |
| 2002/0199098 A1 * | 12/2002 | Davis | 713/160 |
| 2003/0005280 A1 | 1/2003 | Bobde et al. | |
| 2003/0014628 A1 * | 1/2003 | Freed et al. | 713/155 |
| 2003/0014650 A1 | 1/2003 | Freed et al. | |
| 2003/0105810 A1 | 6/2003 | McCrory et al. | |
| 2003/0196084 A1 | 10/2003 | Okereke et al. | |
| 2003/0200332 A1 | 10/2003 | Gupta et al. | |
| 2003/0233539 A1 * | 12/2003 | Tardo et al. | 713/153 |
| 2004/0010596 A1 | 1/2004 | Hui | |
| 2004/0015725 A1 | 1/2004 | Boneh et al. | |
| 2004/0088542 A1 | 5/2004 | Daude et al. | |
| 2004/0210756 A1 | 10/2004 | Mowers et al. | |
| 2004/0215746 A1 | 10/2004 | McCanne et al. | |
| 2004/0243703 A1 | 12/2004 | Demmer et al. | |
| 2005/0001660 A1 | 1/2005 | Roy | |
| 2005/0008158 A1 | 1/2005 | Huh et al. | |
| 2005/0021956 A1 | 1/2005 | Genty et al. | |
| 2005/0050316 A1 | 3/2005 | Peles | |
| 2005/0050362 A1 | 3/2005 | Peles | |
| 2005/0060426 A1 | 3/2005 | Samuels et al. | |
| 2005/0063303 A1 | 3/2005 | Samuels et al. | |
| 2005/0065799 A1 | 3/2005 | Dare et al. | |
| 2005/0074007 A1 | 4/2005 | Samuels et al. | |
| 2005/0081029 A1 | 4/2005 | Thornton et al. | |
| 2005/0108420 A1 | 5/2005 | Brown et al. | |
| 2005/0108517 A1 | 5/2005 | Dillon et al. | |
| 2005/0125553 A1 | 6/2005 | Wu et al. | |
| 2005/0138353 A1 | 6/2005 | Spies et al. | |
| 2005/0138359 A1 | 6/2005 | Simon et al. | |
| 2005/0144463 A1 | 6/2005 | Rossebo et al. | |
| 2005/0160161 A1 | 7/2005 | Barrett et al. | |
| 2005/0187979 A1 | 8/2005 | Christensen et al. | |
| 2005/0240777 A1 | 10/2005 | Keohane et al. | |
| 2005/0265235 A1 | 12/2005 | Accapadi et al. | |
| 2005/0265327 A1 | 12/2005 | Buch et al. | |
| 2005/0273850 A1 | 12/2005 | Freund | |
| 2006/0005239 A1 | 1/2006 | Mondri et al. | |
| 2006/0036859 A1 | 2/2006 | Adams et al. | |
| 2006/0069719 A1 | 3/2006 | McCanne et al. | |
| 2006/0101510 A1 | 5/2006 | Kadyk et al. | |
| 2006/0143700 A1 | 6/2006 | Herrmann | |
| 2006/0143702 A1 | 6/2006 | Hisada et al. | |
| 2006/0168210 A1 | 7/2006 | Ahonen et al. | |
| 2006/0174106 A1 | 8/2006 | Bell et al. | |
| 2006/0190612 A1 | 8/2006 | Kahol et al. | |
| 2006/0209789 A1 | 9/2006 | Gupta et al. | |
| 2006/0212524 A1 | 9/2006 | Wu et al. | |
| 2006/0212935 A1 | 9/2006 | Burman et al. | |
| 2006/0248194 A1 | 11/2006 | Ly et al. | |
| 2006/0253703 A1 | 11/2006 | Eronen et al. | |
| 2007/0038853 A1 | 2/2007 | Day et al. | |
| 2007/0058807 A1 | 3/2007 | Marsh | |
| 2007/0074282 A1 | 3/2007 | Black et al. | |
| 2007/0094373 A1 | 4/2007 | Brendel | |
| 2007/0180227 A1 | 8/2007 | Akimoto | |
| 2007/0180510 A1 * | 8/2007 | Long et al. | 726/10 |
| 2007/0192845 A1 | 8/2007 | Lankheim | |
| 2007/0198836 A1 | 8/2007 | Fedyk et al. | |
| 2007/0199061 A1 | 8/2007 | Byres et al. | |

(56) References Cited

U.S. PATENT DOCUMENTS

| | | | |
|---|---|---|---|
| 2007/0266233 | A1 | 11/2007 | Jethanandani et al. |
| 2008/0046714 | A1 | 2/2008 | Suganthi et al. |
| 2008/0060055 | A1 | 3/2008 | Lau |
| 2008/0065880 | A1* | 3/2008 | Martin .......................... 713/156 |
| 2008/0077982 | A1 | 3/2008 | Hayler et al. |
| 2008/0101445 | A1 | 5/2008 | Ho et al. |
| 2008/0115200 | A1 | 5/2008 | Olson et al. |
| 2008/0126794 | A1 | 5/2008 | Wang et al. |
| 2008/0126801 | A1 | 5/2008 | Lee et al. |
| 2008/0263215 | A1 | 10/2008 | Schnellbaecher |
| 2008/0307219 | A1 | 12/2008 | Karandikar |
| 2009/0013399 | A1* | 1/2009 | Cottrell et al. .................. 726/12 |
| 2009/0070841 | A1 | 3/2009 | Buga et al. |
| 2009/0073943 | A1 | 3/2009 | Krishnaswamy et al. |
| 2009/0083537 | A1 | 3/2009 | Larsen et al. |
| 2009/0083538 | A1* | 3/2009 | Merugu et al. ................ 713/153 |
| 2009/0089862 | A1 | 4/2009 | Sun |
| 2009/0113537 | A1 | 4/2009 | Woo |
| 2009/0119504 | A1 | 5/2009 | van Os et al. |
| 2009/0132807 | A1 | 5/2009 | Schneider |
| 2009/0138577 | A1 | 5/2009 | Casado et al. |
| 2009/0144408 | A1 | 6/2009 | Wilf et al. |
| 2009/0220080 | A1 | 9/2009 | Herne et al. |
| 2010/0031042 | A1 | 2/2010 | Di Crescenzo et al. |
| 2010/0031337 | A1 | 2/2010 | Black et al. |
| 2010/0037311 | A1 | 2/2010 | He et al. |
| 2010/0049970 | A1 | 2/2010 | Fraleigh et al. |
| 2010/0071048 | A1 | 3/2010 | Novak et al. |
| 2010/0115581 | A1 | 5/2010 | Goldschlag et al. |
| 2010/0242097 | A1 | 9/2010 | Hotes et al. |
| 2010/0242106 | A1 | 9/2010 | Harris et al. |
| 2010/0299525 | A1 | 11/2010 | Shah et al. |
| 2010/0325419 | A1 | 12/2010 | Kanekar |
| 2011/0231649 | A1 | 9/2011 | Bollay et al. |
| 2011/0231651 | A1 | 9/2011 | Bollay |
| 2011/0231652 | A1 | 9/2011 | Bollay et al. |
| 2011/0231653 | A1 | 9/2011 | Bollay et al. |
| 2011/0231655 | A1 | 9/2011 | Bollay et al. |
| 2011/0231923 | A1 | 9/2011 | Bollay et al. |

FOREIGN PATENT DOCUMENTS

| | | | |
|---|---|---|---|
| JP | 2001-333110 | A | 11/2001 |
| KR | 10-2006-0062356 | A | 6/2006 |
| WO | 0103398 | A2 | 1/2001 |
| WO | 0137068 | A2 | 5/2001 |
| WO | 2004/036360 | A2 | 4/2004 |
| WO | 2005001660 | A2 | 1/2005 |
| WO | 2005060202 | A1 | 6/2005 |
| WO | 2007021483 | A2 | 2/2007 |

OTHER PUBLICATIONS

TCP/IP options for high-performance data transmission (Builder.com.com/5100-6372-1050878.html), Dec. 9, 2005.
Wireless/Networking (compnetworking.about.com/od/tcpip/l/bldef_nagle.htm), Dec. 6, 2005.
TCP. Section—Linux Programmer's Manual (7) (www.fifi.org/cgi-bin/man2html/usr/share/man/man7/tcp.7.gz), Dec. 9, 2005.
RFC 896—Congestion control in IP/TCP internetworks (www.faqs.org/rfcs/rfc896.html), Jan. 6, 1984.
RSA Laboratories. PKCS #1 v2.0: RSA Cryptography Standard, Oct. 1, 1998.
Berners-Lee et al, RFC 1945, Hypertext Transfer Protocol—HTTP/1.0, Network Working Group, May 1996.
Dierks and Allen, RFC 2246, The TLS Protocol Version 1.0, Network Working Group, Jan. 1999.
The OpenSSL Project.
"Application Switching Scaling Next-Generation Network," white paper, Nortel Networks, Jan. 2008.
"Array Networks: RSA Security Certifies Array SSL Security Proxy and Integrated Web Traffic Manager; Array Products First in Class to Receive RSA BSAFE SSL-C Certification; Array Products to Include RSA BSFE Cert-C Certificate Management Software," M2 Presswire, Oct. 21, 2002.
"Introduction to Secure Sockets Layer," white paper, Cisco Systems, Feb. 2003.
Lesniewski-Laas, Chris et al., "SSL splitting: securely serving data from untrusted caches," 2003, http://web.mit.edu/golem/Public/barnraising:usenix-security-2003.pdf.
Yaping, Yang et al., "Design and implementation of SSL based secure transmission system," Journal of Beijing University of Aeronautics and Astronautics, Aug. 2001, 27(4):469-473.
Official Communication for U.S. Appl. No. 12/846,778 mailed Aug. 7, 2012.
Freier, A. O. et al., "The SSL Protocol, Version 3.0," Nov. 18, 1996, 63 pages.
Mittra, S., "Iolus: A Framework for Scalable Secure Multicasting," Proceedings of the ACM SIGCOMM '97, Sep. 14-18, 1997, 12 pages.
Rescorla, E., "Datagram Transport Layer Security," RFC 4347, Network Working Group, Apr. 2006, 26 pages.
Official Communication for U.S. Appl. No. 12/967,006 mailed Sep. 17, 2012.
Official Communication for U.S. Appl. No. 12/846,778 mailed Nov. 23, 2012.
Official Communication for U.S. Appl. No. 12/848,096 mailed Nov. 30, 2012.
Official Communication for U.S. Appl. No. 13/051,994 mailed Nov. 21, 2012.
International Search Report and Written Opinion for International Patent Application No. PCT/US2011/029079 mailed Oct. 31, 2011.
International Preliminary Report on Patentability for International Patent Application No. PCT/US2011/029079 mailed Oct. 4, 2012.
Official Communication for U.S. Appl. No. 13/052,005 mailed Feb. 1, 2013.
Official Communication for U.S. Appl. No. 13/051,994 mailed Mar. 14, 2013.
Official Communication for U.S. Appl. No. 12/967,006 mailed Apr. 9, 2013.
Dierks and Allen, RFC 2246. The TLS Protocol Version 1.0, Network Working Group, Jan. 1999.
Fielding et al., RFC 2616, Hypertext Transfer Protocol—HTTP/1.1, Network Working Group, Jun. 1999.
Kessler, RFC 1739, A Primer on Internet and TCP/IP Tools, Network Working Group, Dec. 1994.
Netscape Communications Corp., "Secure Sockets Layer (SSL) version 3", Mar. 1996.
Paxson, RFC 2525, Known TCP Implementation Problems, Network Working Group, Mar. 1999.
Rescoria, "SSL and TLS—Designing and Building Secure Systems" pp. 1-46, Mar. 2001.
Nagle's Algorithm (Searchnetworking.techtarget.com/sdefinition/0..sid7gci754347.00.html), Dec. 6, 2005.
HTTP/1.1 and Nagle's Algorithm (w3.org), Dec. 6, 2005.
"BiIG-IP e-Commerce Solutions Guide, version 4.5," F5 Networks, Feb. 27, 2010, 58 pages.
"BIG-IP Reference Guide, version 4.5," F5 Networks, Feb. 27, 2010, 43 pages.
"BIG-IP Solutions Guide, version 4.5," F5 Networks, Feb. 23, 2010, 36 pages.
"Kerberos: The Network Authentication Protocol," MIT.edu, first released Feb. 24, 2000, 2 pages http://web.mit.edu/Kerberos.
"Kerberos (protocol)," Wikipedia.org, initially published Feb. 25, 2002, 5 pages http://en.wikipedia.org/wiki/Kerberos_(protocol).
"Integrated Windows Authentication (IIS 6.0)," Microsoft TechNet, Jun. 23, 2003, 3 pages http://www.microsoft.com/technet/prodtechnol/WindowsServer2003/Library/IIS/523ae943-5e6a-4200-9103-9808baa00157.mspx?mfr=true.
"Manual: BIG-IP Reference Guide v4.6.2," F5 Networks, Feb. 23, 2010; 13 pages.
"Manual Chapter: BIG-IP version 4.6.2 Reference Guide: SSL Accelerator Proxies," F5 Networks, Fev. 23, 2010, 46 pages.
"Microsoft NTLM," Microsoft, Inc., build date Jul. 16, 2013, 2 pages http://msdn.microsoft.com/en-us/library/aa378749.aspx.

(56) References Cited

OTHER PUBLICATIONS

"NTLM," Wikipedia.org, initially published Feb. 12, 2006, 5 pages http://en.wikipedia.org/wiki/NTLM.

"OpenSSL—Welcome to the OpenSSL Project," The OpenSSL Project, 2005, 1 page.

"Release Note: BIG-IP Controller 4.5," F5 Networks, Oct. 30, 2002, 16 pages.

"Release Note: BIG-IP Version 4.6.2 Release Note," F5 Networks, Mar. 5, 2007, 36 pages.

Christensen, J. M., "Kerberos in a Sharepoint Environment," WindowSecurity.com, Jul. 30, 2008, 6 pages http://www.windowsecurity.com/articles/Kerberos-Sharepoint-Environment.html.

Dierks, T. et al., "The Transport Layer Security (TLS) Protocol, Version 1.2," RFC 5246, Network Working Group, Aug. 2008, 104 pages.

Glass, E., "The NTLM Authentication Protocol and Security Support Provider," SourceForge.net, 2003, 95 pages http://davenport.sourceforge.net/ntlm.html.

Malkhi, D. et al., "Fairplay—A Secure Two-Party Computation System" Proceedings of the 13th USENIX Security Symposium, Aug. 9-13, 2004, 22 pages.

Pfitzmann, B. et al., "A Model for Asynchronous Reactive Systems and its Application to Secure Message Transmission," Proceedings of the 2001 IEEE Symposium on Security and Privacy, May 2001, 17 pages.

Reid, B. et al., "Improving the Performance of IIS 6.0 Applications," TechNet Blogs, The Industry Insiders, Jul. 15, 2005, 3 pages http://blogs.technet.com/b/industry_insiders/archive/2005/07/15/407751.aspx.

Tschalär, R. et al., "NTLM Authentication Scheme for HTTP," Jun. 17, 2003, 5 pages http://www.innovation.ch/personal/ronald/ntlm.html.

Zhu et al., "Splendor: A Secure, Private, and Location-aware Service Discovery Protocol Supporting Mobile Services," Proceedings of the First IEEE International Conference on Pervasive Computing and Communication (PerCom'03), Mar. 2003. pp. 235-242.

Official Communication for U.S. Appl. No. 12/848,096 mailed Jul. 9, 2013.

Official Communication for U.S. Appl. No. 13/052,005 mailed Jul. 16, 2013.

Official Communication for U.S. Appl. No. 12/846,778 mailed Sep. 16, 2013.

Official Communication for U.S. Appl. No. 13/051,963 mailed Sep. 26, 2013.

Official Communication for U.S. Appl. No. 11/420,677 mailed Nov. 6, 2013.

Official Communication for U.S. Appl. No. 12/967,006 mailed Nov. 19, 2013.

Official Communication for U.S. Appl. No. 13/052,005 mailed Nov. 27, 2013.

Martin, Franck. "SSL Certificates HOWTO.", pp. 1-36, Oct. 20, 2002. URL: http://www.tldp.org/HOWTO/SSL-Certificates-HOWTO/ (Mar. 14, 2003).

SiteCelerate Whitepaper—pp. 1-9, 2005. http://www.arahe.com/webaccelerate/sc_wp.pdf.

Cisco Whitepaper—"Cisco Application Networking for IBM WebSphere", pp. 1-10, 1992-2007. https://www.cisco.com/application/pdf/en/us/guest/netsol/ns432/c649/ccmigration_09186a0080908167.pdf.

* cited by examiner

ACCESSING SSL CONNECTION DATA BY A THIRD-PARTY

CROSS-REFERENCE TO RELATED APPLICATIONS

The present application claims benefit of provisional application Ser. No. 60/785,151 entitled "Method, System, And Apparatus For Accessing SSL Connection Data By A Third-Party," filed on Mar. 23, 2006, the benefit of the earlier filing date of which is hereby claimed under 35 U.S.C. §119 (e) and 37 C.F.R. §1.78, and which is further incorporated by reference.

BACKGROUND OF THE INVENTION

The present invention relates generally to network communications, and more particularly, but not exclusively, enabling a proxy device access to content within and/or management of an SSL connection between a client device and a server device.

An increasing number of applications within an enterprise provide secure communications between a client device and a server device. These applications include intranet portals, Webmail, front-office applications, such as Clarify, back-office applications, and the like. Many of these applications may also be accessed from a branch office either through a Virtual Private Network (VPN) tunnel, directly over the public Internet, or the like. These applications may be available on a server device inside a head office. The head office and branch office are networks of computing devices secured behind security perimeters, such as behind firewalls, or the like. The computing devices at the head office often are enabled to access sensitive information, or the like.

A traditional method of providing secure communications between the client device and the server device employs a web browser and a web server or HyperText Transfer Protocol (HTTP) server to establish an encrypted connection. Encrypted connections may be implemented using a variety of secure communication protocols, including Secure Sockets Layer (SSL) protocol, Transport Layer Security (TLS) protocol, or the like. The SSL protocol is described in Netscape Communications Corp, *Secure Sockets Layer (SSL)* version 3, http://home.netscape.com/eng/ss13/(November 1996). The TLS protocol is derived from SSL, and is described in Dierks, T., and Allen, C., "The TLS Protocol Version 1.0," RFC 2246 (January 1999), is available at http://www.ietforg/rfc/rfc2246.txt.

Communications between the client device, which may reside in a branch office, and the server device, which may reside in a head office, may be secured, accelerated, and otherwise improved by communication optimizations. For example, Wide Area Network (WAN) optimization solutions may improve the communication between the branch office and the head office. WAN optimization solutions may employ data compression or binary sequence caching. Other solutions may even modify the application-level protocol. However, many of the solutions require access to unencrypted data.

One approach to access the unencrypted data is to terminate the SSL session locally at the branch office, perform inspections or WAN optimizations, and re-encrypt the data back to the head office. This SSL termination and re-encryption can be performed by an SSL accelerator such as one of the BIG-IP® family of traffic managers, by F5 Networks of Seattle, Wash. However, in order to perform the SSL termination at the branch office, the SSL accelerator may require access to certificates and private keys. This access may be a certificate management challenge. In many cases, the certificates and private keys may be stored at the head office. The branch office may require access to a directory service, such as a Lightweight Directory Access Protocol (LDAP), to provide the certificates. Additionally, distributing multiple copies of private keys to the branch office may reduce the security of the system and may violate the security policy of an enterprise.

Another challenge posed by the termination of the SSL session at the branch office is the management and control of the SSL connection. In order for the data to be inspected and/or optimized, a third-party may need to inspect the unencrypted data. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
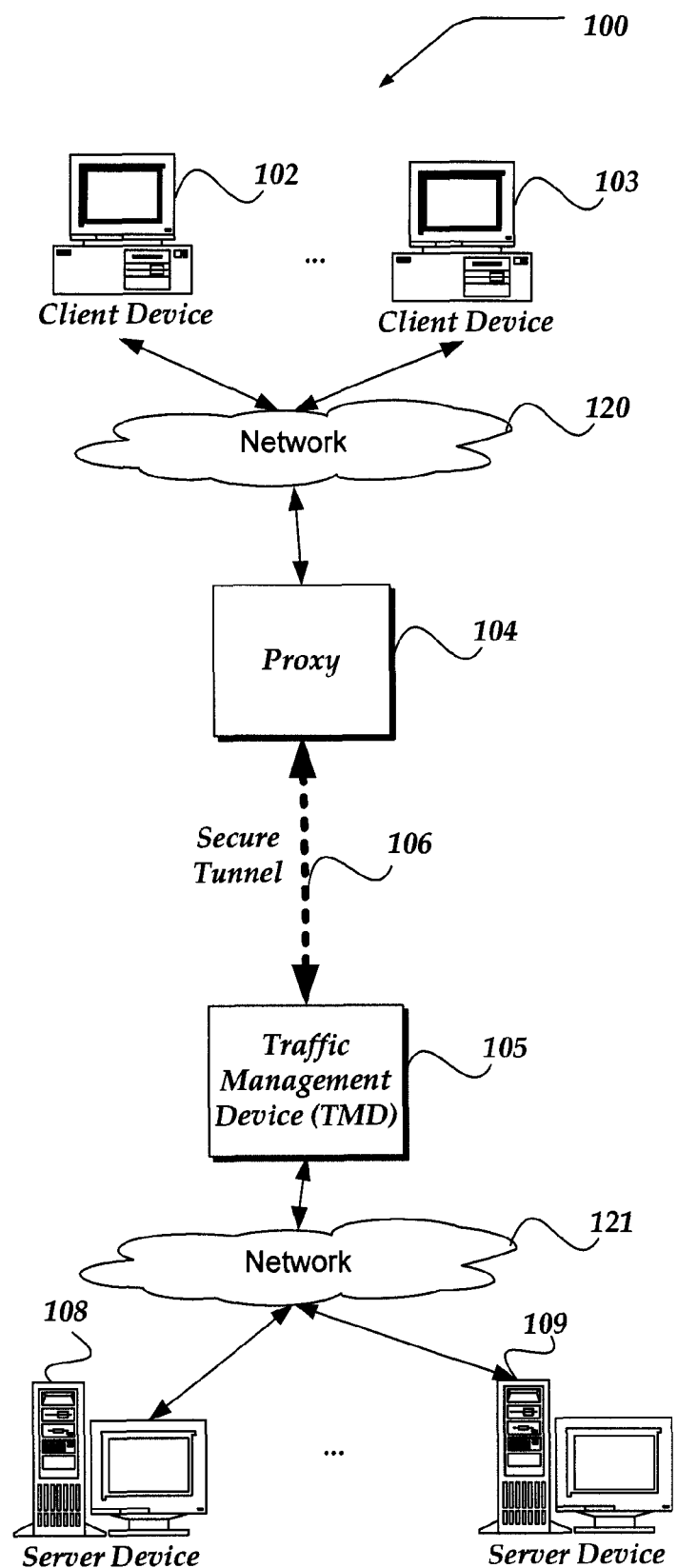
FIG. 1 shows a functional block diagram illustrating an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and the include plural references. The meaning of "in" includes "in" and "on."

As used herein, application layer refers to layers 5 through 7 of the seven-layer protocol stack as defined by the ISO-OSI (International Standards Organization-Open Systems Interconnection) framework.

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments 793, which is available at http://www.ietf.org/rfc/rfc0793.txt?number=793. A network connection "over" a particular path or link refers to a network connection that employs the specified path or link to establish and/or maintain a communication. The term "node" refers to a network element that typically interconnects one or more devices, or even networks.

As used throughout this application, including the claims, the term "SSL" refers to SSL, TLS, and all secure communications protocols derived therefrom. An SSL connection is a network connection that is secured by cryptographic operations according to an SSL protocol. The SSL protocol typically operates between an application layer (OSI layer 7) and a transport layer (OSI layer 4), but may also be used to encapsulate or tunnel lower layer protocols within itself. The SSL protocol may provide security for application layer protocols such as HyperText Transfer Protocol (HTTP), Lightweight Directory Access Protocol (LDAP), Internet Messaging Access Protocol (IMAP), Post Office Protocol (POP), Session Initiation Protocol (SIP), or the like. For example, HTTP over SSL (HTTPS) utilizes the SSL protocol to secure HTTP data. The SSL protocol may utilize TCP/IP on behalf of the application layer protocols to transport secure data. The SSL protocol may also employ a certificate. In one embodiment, the certificate is an X.509 certificate, such as those described in Request for Comments (RFC) 2459 available at http://www.ietf.org/rfc/rfc2459.txt?number=2459.

The SSL protocol uses an SSL handshake protocol to initiate an SSL session and/or SSL connection. An SSL session may be associated with one or more SSL connections. The SSL handshake protocol includes an SSL re-handshake protocol for initiating another SSL connection. The other SSL connection may be associated with the current SSL session or with another SSL session.

Briefly, SSL messages may be categorized into four general categories: application data, protocol alerts, protocol handshake messages, and cipher-control messages (e.g., change_cipher_spec). Protocol alerts, protocol handshake messages, and cipher-control messages are associated with messages for managing the SSL protocol. For example, an SSL alert may be used for signaling, among other things, error conditions.

The SSL handshake protocol includes the exchange and processing of a series of messages, which may be one or more of an alert, handshake, and/or change_cipher_spec message. An SSL handshake message is a network record of the handshake content type. The SSL handshake message also includes an associated SSL handshake type, and one or more data fields.

A more complete description of the SSL handshake protocol may be found, in addition to the references mentioned above, in "SSL and TLS, Designing and Building Secure Systems," by Eric Rescorla, $8^{th}$ printing, May 2005 by Addison-Wesley, which is hereby incorporated within. Briefly, however, an SSL handshake protocol is a process that involves an exchange of SSL handshake messages between entities involved in a setup of an SSL session. The intent of this process is to establish common parameters under which communicating parties may agree to transmit and/or receive data, such as a set of algorithms with which the entities may use to protect its communications, and a set of cryptographic keys that may be used by those algorithms. The SSL handshake protocol may also authenticate one party to another party, if required. In one embodiment, authentication may be performed using public key cryptography.

The SSL handshake protocol typically begins with a connection initiator device sending to a connection respondent device, among other things, randomly generated data within a CLIENT-HELLO message (e.g. an SSL handshake message with an associated SSL handshake type of "CLIENT-HELLO"). The connection respondent device responds to the CLIENT-HELLO message with, among other things, randomly generated data within a SERVER-HELLO message, along with its algorithm preferences. In addition, the connection respondent may provide a Certificate message that includes a connection respondent certificate which the connection initiator device may use to authenticate the connection respondent.

The connection initiator device, using the connection initiator device's and connection respondent device's randomly generated data, generates a pre-master secret for an SSL session. The connection initiator device then sends the pre-master secret to the connection respondent device in an SSL handshake message. In one embodiment, the pre-master secret may be encrypted using a public key associated with the connection respondent device (obtained from the connection respondent device's certificate). Typically, the SSL handshake message that includes the pre-master secret is a CLIENT-KEY-EXCHANGE handshake message. Each of the connection initiator device and the connection respondent device, separately, perform a series of steps to generate a master secret using the pre-master secret. Then, separately, each of the connection initiator device and the connection respondent device use the master secret to generate session keys, which are typically, symmetric keys used to encrypt and decrypt communicated data over the associated SSL connection. The connection initiator device and the connection respondent device may then use their session keys to generate and send messages to each other indicating that the SSL handshake is finished. The SSL connection may now be employed by the connection respondent device and/or the connection initiator device to send SSL messages with encrypted payloads to each other.

As used herein, the term "forwarding" refers to receiving data over a network connection and sending the data to a destination associated with the data.

As used herein, the phrase "terminating an SSL connection" refers to the action of being one of the two endpoints of an SSL connection. The endpoints of an SSL connection are commonly referred to as an SSL client and an SSL server. However, the invention is not constrained to merely a client/server architecture, and other computing architectures may also be employed, including, for example, a peer-to-peer architecture, or the like. Thus, an SSL client may also be referred to more generally as an SSL connection initiator or simply a connection initiator while an SSL server may be referred to more generally as an SSL connection respondent, or simply a connection respondent. The phrase "establishing an SSL connection" refers to participating in an SSL handshake protocol as an SSL endpoint.

As used herein, the phrase "out-of-band" refers to sending data outside of a current connection, such as sending the data distinct from using a current SSL connection. In one embodiment, a different SSL connection may be used to send the data.

As used herein, "transposing" refers to modifying data in such a way that the modification is intended to be reversed by a receiver to generate the original data. For example, encryption and lossless compression are ways of transposing data. Data can also be modified in a way that the original data cannot be, or is not intended to be, re-created by a receiver. For example, deleting portions of data, substituting portions of data, and inserting additional data are ways of modifying data that is not considered transposing, as used herein.

As used herein, the phrase "secret data" refers to data that enables an SSL handshake between two devices and that is not typically intended as destined for a third device other than as described as part of the present invention. Secret data includes a master secret and a pre-master secret as described in RFC 2246, referenced above.

As used herein, the term randomly generated data, or random data includes pseudo-randomly generated data. Random data (or pseudo-random data) may be generated using any of a variety of mechanisms. For example, the random data may be generated using a variety of pseudo-random number generators, a hardware source, including a hardware source based on thermal noise, or the like.

As used herein, the term "payload" refers to data included within a network packet, and distinct from a network packet header of the network packet.

Briefly stated, the present invention is directed towards enabling access by a third-party to a payload sent over an SSL connection between a client and a server. In one embodiment, the SSL connection may be established between the client and a traffic management device (TMD) that operates on behalf of a plurality of servers. In one embodiment, the third-party may be a proxy interposed between a client and the server (or TMD). SSL handshake messages are sent between the client and the server (or TMD) to establish the SSL connection. As the SSL handshake messages are forwarded through the proxy, the proxy may extract data from at least one of the SSL handshake messages. In addition, one of the client or the server (or TMD) may send another message directly for use by the proxy. In one embodiment, the other message may be an SSL handshake record, or an SSL alert message. Within the other message may be secret data that the proxy may use to generate a session key for the SSL connection. In one embodiment, the secret data may be sent out-of-band of an SSL connection associated with the SSL handshake message. In one embodiment, the other message, which includes the secret data, may be received before a FINISHED message is received and/or after a CHANGE-CIPHER-SPEC message. With the session key, the proxy may receive SSL messages over the SSL connection, modify and/or transpose the payload within the received SSL messages, and/or terminate the SSL connection at the proxy.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-103, networks 120-121, proxy 104, secure tunnel 106, traffic management device (TMD) 105, and server devices 108-109. Although not illustrated, another network may be interposed between proxy 104 and TMD 105.

Generally, client devices 102-103 may include virtually any computing device capable of connecting to another computing device to send and receive information, including web requests for information from a server device, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 may be any device that is capable of connecting using a wired or wireless communication medium such as a PDA, POCKET PC, wearable computer, and any other device that is equipped to communicate over a wired and/or wireless communication medium.

Client devices 102-103 may further include a client application that is configured to manage various actions. Moreover, client devices 102-103 may also include a web browser application that is configured to enable an end-user to interact with other devices and applications over network 120.

Client devices 102-103 may communicate with network 120 employing a variety of network interfaces and associated communication protocols. Client device 102 may, for example, use various dial-up mechanisms with a Serial Line IP (SLIP) protocol, Point-to-Point Protocol (PPP), and the like. As such, client devices 102-103 may transfer data at a low transfer rate, with potentially high latencies. For example, client devices 102-103 may transfer data at about 14.4 to about 46 kbps, or potentially more. In another embodiment, client devices 102-103 may employ a higher-speed cable, Digital Subscriber Line (DSL) modem, Integrated Services Digital Network (ISDN) interface, ISDN terminal adapter, or the like. As such, client devices 102-103 may be considered to transfer data using a high bandwidth interface varying from about 32 Kbps to over about 622 Mbps, although such rates are highly variable, and may change with technology.

Network 120 is configured to couple client devices 102-103, with other network devices, such as proxy 104, or the like. In one embodiment, network 120 may enable SSL connections between client devices 102-103 and proxy 104. Network 121 is configured to couple server device devices 108-109, with other network devices, such as TMD 105, or the like. Networks 120-121 are enabled to employ any form of computer readable media for communicating information from one electronic device to another. In one embodiment, networks 120-121 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Networks 120-121 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client devices 102-103, or the like, with various degrees of mobility. For example, networks 120-121 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, networks 120-121 include any communication method by which information may travel between one network device and another network device.

Additionally, networks 120-121 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media. As mentioned above, in one embodiment, another network (not shown) may reside between proxy 104 and TMD 105. This other network may operate substantially similar to networks 102-121 to enable communications between networked devices.

Secure tunnel 106 includes any tunnel for communicating information between network devices. As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (or encapsulate) them inside of frames from another network system. Examples of tunneling protocols include, but are not limited to IP tunneling, Layer 2 Tunneling Protocol (L2TP), Layer 2 Forwarding (L2F), VPNs, IP SECurity (IPSec), Point-to-Point Tunneling Protocol (PPTP), GRE, MBone, and SSL/TLS. As shown, data is tunneled between proxy 104 and TMD 105 over secure tunnel 106.

One embodiment of a network device that could be used as proxy 104 is described in more detail below in conjunction with FIG. 2. Briefly, however, proxy 104 includes virtually any network device that receives and forwards, or relays, network traffic between two or more network devices. Typically, proxy 104 operates on behalf of the two or more network devices. In one embodiment, proxy 104 may reside within a branch office security perimeter (not shown), or the like. In one embodiment, proxy 104 may passively forward data from a source to a destination. For example, proxy 104 may forward one or more SSL handshake messages between one of the client devices to TMD 105. The SSL handshake messages may be used to establish an SSL connection between the client device and TMD 105.

As described in more detail below, proxy 104 may receive data that enables it to perform various additional actions on SSL messages sent over the SSL connection between one of the client devices and TMD 105. For example, proxy 104 may be enabled to read, modify, and/or transpose data within an SSL message. In another embodiment, proxy 104 may also be enabled to terminate the SSL connection from one of the client devices. In one embodiment, proxy 104 may perform inspection, WAN optimizations, or the like on data obtained from the terminated connection. For example, proxy 104 may receive an encrypted payload within an SSL message from one of the client devices, the SSL message payload being intended for one of the server devices (108-109). Proxy 104 may receive the SSL message, extract the payload, and perform various actions on the decrypted payload, including, compressing it, collating it, encoding it, or the like. In one embodiment, proxy 104 may then tunnel the payload over secure tunnel 106 to TMD 105. In one embodiment, multiple streams of data from a plurality of clients, such as client devices 102-103 may be collated into one stream of data by proxy 104 to be tunneled over secure tunnel 106.

Devices that may operate as proxy 104 include, but are not limited to, personal computers, desktop computers, multiprocessor systems, microprocessor-based or programmable consumer electronics, network PCs, servers, routers, bridges, firewalls, gateways, network appliances, or the like.

TMD 105 includes virtually any network device that manages network traffic. Such devices include, for example, routers, proxies, firewalls, load balancers, cache devices, application accelerators, devices that perform network address translation, any combination of the preceding devices, or the like. TMD 105 may control, for example, the flow of data packets delivered to or forwarded from an array of server device devices, such as server devices 108-109. In one embodiment, messages sent between the TMD 105 and the server devices 108-109 may be over a secure channel, such as an SSL connection.

TMD 105 may direct a request for a resource to a particular server device based on network traffic, network topology, capacity of a server device, content requested, and a host of other traffic distribution mechanisms. TMD 105 may receive data packets from and transmit data packets to the Internet, an intranet, or a local area network accessible through another network. TMD 105 may recognize packets that are part of the same communication, flow, and/or stream and may perform special processing on such packets, such as directing them to the same server device so that state information is maintained. TMD 105 also may support a wide variety of network applications such as Web browsing, email, telephony, streaming multimedia and other traffic that is sent in packets. The BIG-IP® family of traffic managers, by F5 Networks of Seattle, Wash., are examples of TMDs. In one embodiment, TMDs 106 may be integrated with one or more of server devices 108-109, and provide content or services in addition to the TMD functions described herein.

TMD 105 may receive requests from client devices 102-103, through proxy 104. TMD 105 may select a server device from server devices 108-109 to forward the request. TMD 105 may employ any of a variety of criteria and mechanisms to select the server device, including those mentioned above, load balancing mechanisms, and the like. TMD 105 may receive a response to the request and forward the response to client devices 102-103.

TMD 105 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

In one embodiment, TMD 105 may perform an SSL handshake with one of client devices 102-103. For example, TMD 105 may send to one of client devices 102-103, SSL handshake messages through proxy 104. In one embodiment, TMD 105 may use specialized hardware to perform SSL processing. In one embodiment, authentication and authorization of client devices 102-103 may be centralized within TMD 105.

In one embodiment, TMD 105 may reside within a head office security perimeter (not shown), or the like. In one embodiment, private keys for processing an SSL protocol may be centralized inside of the head office security perimeter, a Federal Information Processing Standard (FIPs) boundary, or the like. TMD 105 may be enabled to access the private keys, or the like, through a variety of mechanisms. In one embodiment, a client certificate validation is centralized inside of the head office security perimeter, at TMD 105, or the like.

Server devices 108-109 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 108-109 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between server devices 108-109, TMD 105, and client device 102 employing HTTP, HTTPS, or any of a variety of protocols.

In one embodiment, server devices 108-109 are configured to operate as a website server. However, server devices 108-109 are not limited to web server devices, and may also operate a messaging server, a File Transfer Protocol (FTP) server, a database server, content server, and the like. Additionally, each of server devices 108-109 may be configured to perform a different operation. Thus, for example, back-end server device 108 may be configured as a messaging server, while back-end server device 109 is configured as a database server. Moreover, while server devices 108-109 may operate as other than a website, they may still be enabled to receive an HTTP communication, as well as a variety of other communication protocols Devices that may operate as server devices 108-109 include personal computers, desktop computers, multiprocessor systems, microprocessor-based or programmable consumer electronics, network PCs, server devices, and the like.

It is further noted that terms such as client and server device may refer to functions within a device. As such, virtually any device may be configured to operate as a client device, a server device, or even include both a client and a server device function. Furthermore, where two or more peers are employed, any one of them may be designated as a client or as a server, and be configured to confirm to the teachings of the present invention. Thus, the invention is not to be construed as being constrained to a client/server architecture.

Illustrative Network Device

Figure 2:
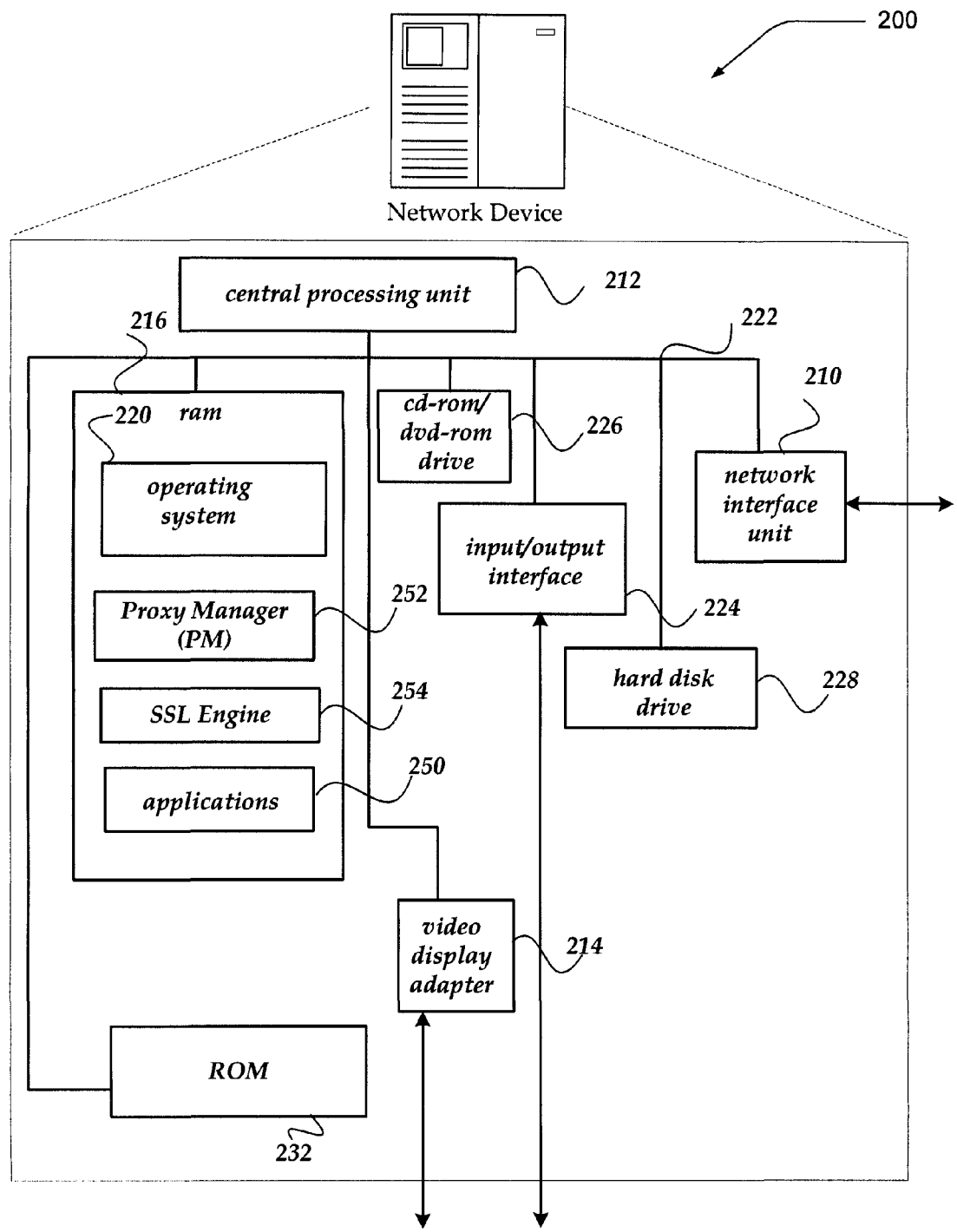
FIG. 2 shows one embodiment of a network device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, proxy 104 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Network device 200 also includes applications 250, proxy manager (PM) 252, and SSL engine 254.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, traffic management programs, security programs, and so forth.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like. Such applications may include, for example, SSL engine 254.

SSL engine 254 may be enabled to perform SSL processing, including managing an SSL handshake, managing keys, certificates, client authentication, client authorization, or the like. Moreover, SSL engine 254 is further enabled to establish SSL sessions and/or connections, terminate SSL sessions and/or connections, or the like. Additionally, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of Proxy Manager (PM) 252 and/or SSL engine 254.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

PM 252 is configured to relay network traffic between two or more network devices. In one embodiment, PM 252 is enabled to perform the operations described in more detail below in conjunction with FIGS. 3-4. PM 252 may further monitor messages it receives, and/or forwards. In one embodiment, PM 252 may extract information from a received message, such as an SSL handshake message. The extracted information may include data, such as data that is randomly generated by a sender, or the like, and provided within the SSL handshake message for use in establishing an SSL session.

PM 252 may also receive from a network device, such as a client device, or a server device associated with the SSL session, other information, including secret data associated with the SSL session. PM 252 may employ the extracted data and the secret data to generate a session key associated with the SSL session. In one embodiment, PM 252 may provide the data to SSL engine 254, which in turn generates the session key. In any event, PM 252 may then employ the session key to perform actions on SSL messages sent over the SSL session. For example, PM 252 may perform SSL decryption and re-encryption utilizing the session key. In one embodiment, PM 252 may also perform inspection, network optimizations, or the like on data obtained over the SSL session. PM 252 may also obtain data from the SSL session and provide the data to another device. For example, PM 252 may tunnel the data to the other device by using any of the available applications that support a variety of tunneling mechanisms.

Generalized Operation

Figure 3:
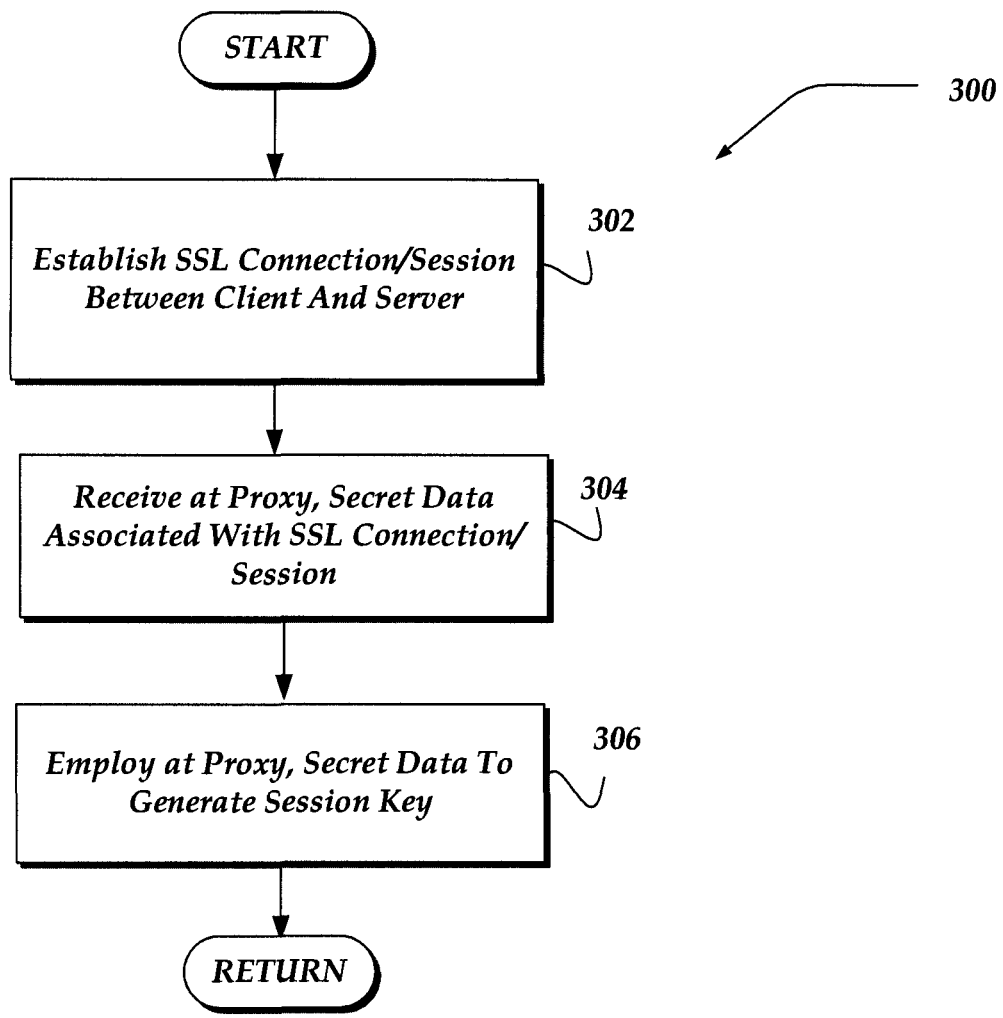
FIG. 3 illustrates a logical flow diagram generally showing one embodiment of an overview of a process for receiving at a proxy secret data associated with an SSL connection.

The operation of certain aspects of the invention will now be described with respect to FIGS. 3-5. FIG. 3 illustrates a logical flow diagram generally showing one embodiment of a process for receiving at a proxy, secret data associated with an SSL session. Process 300 of FIG. 3 may be implemented, for example, within proxy 104 of FIG. 1.

Process 300 begins, after a start block, at block 302, where an SSL session is established between a client device (connection initiator) and a server device (connection respondent). In one embodiment, the server device may be a TMD. In one embodiment, a proxy, interposed between the client device and the server device, may forward SSL handshake messages between the client device and the server device to enable the SSL session to be established. The client device and server device may provide SSL handshake messages such as those described above.

Processing continues next to block 304 where secret data associated with the SSL session is received at the proxy. In one embodiment, block 304 may occur concurrently with block 302, or even before block 302. In one embodiment, the secret data may include a master secret, a pre-master secret, the session key, or the like, associated with the SSL session. In one embodiment, other data received from the forwarded SSL handshake message may also be extracted including the client's and/or server's randomly generated data. In one embodiment, the secret data may be encrypted. For example, the secret data may be encrypted with a cryptographic key that the proxy and a sender of the key share, with the proxy's public key, or the like.

In one embodiment, the secret data may be sent from the client device, the server device, the TMD, or the like. In one embodiment, the secret data, including a master secret and/or pre-master secret, may be received at the proxy within the SSL handshake protocol. For example, a SSL handshake message, which includes the master secret, may be received before a FINISHED message is received and/or after a CHANGE-CIPHER-SPEC message. This SSL handshake message (e.g. record) may be of a new SSL handshake type not defined within the SSL handshake protocol as described in RFC 2246, may be an SSL alert, or the like. In an alternate embodiment, the secret data may be sent out-of-band of the SSL handshake protocol, SSL session, or the like. Processing then continues to block 306.

At block 306, the proxy may generate a session key associated with the SSL session, based at least in part on the secret data and the other data. The session key may be used for symmetric encryption/decryption of data over the SSL session.

In one embodiment (not shown), other SSL handshake messages may be forwarded by the proxy, thereby completing the SSL handshake between the client device and the server device. For example, the proxy may forward a FINISHED message from the server device to the client device. In any event, processing then returns to a calling process for further processing.

Figure 4:
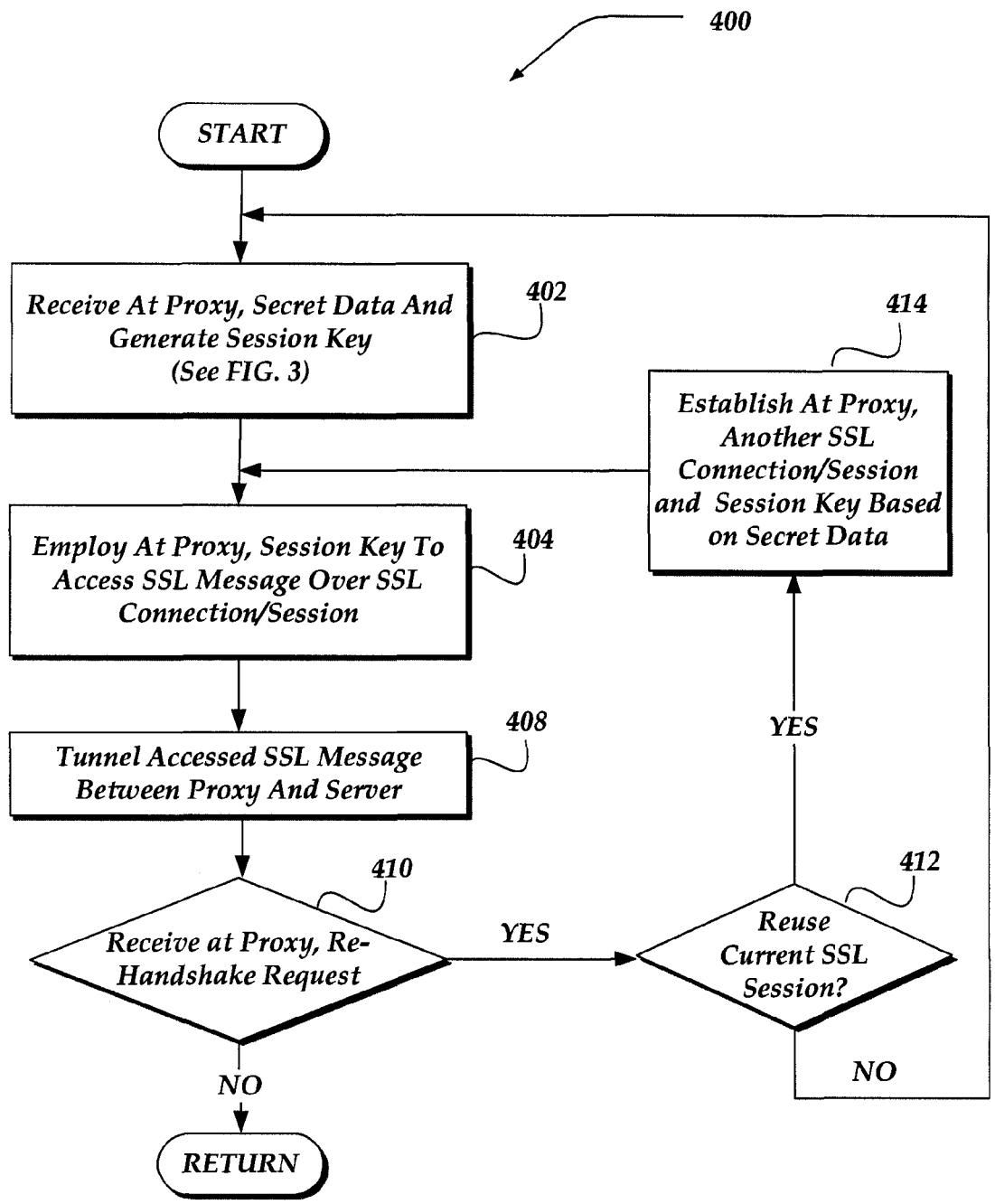
FIG. 4 illustrates a logical flow diagram generally showing one embodiment of a process for employing secret data to access, by a proxy, content within an SSL message sent over the SSL connection.

FIG. 4 illustrates a logical flow diagram generally showing one embodiment of a process for employing secret data to access an SSL message at a proxy. Process 400 of FIG. 4 may be implemented, for example, within proxy 104 of FIG. 1.

Process 400 begins, after a start block, at block 402, where secret data associated with an SSL session is received at a proxy and a session key is generated. In one embodiment, the operations of block 402 correspond substantially to process 300 of FIG. 3. For example, an SSL session is established between a client device and a server device, the secret data is received at the proxy, and the secret data is employed by the proxy to generate a session key. Processing next continues to block 404.

At block 404, the session key is employed by the proxy to access an SSL message over the SSL connection. In one embodiment, the SSL message's payload may be decrypted using the session key. The proxy may then inspect the decrypted payload and perform actions based, at least in part, on the payload. For example, the payload may be utilized to make a traffic management decision. The payload may also be scanned, logged, audited, or the like.

In one embodiment, the proxy may decrypt, modify, transpose, and/or re-encrypt the payload for further processing. In one embodiment, the SSL message may be received by the proxy over the SSL session and a payload within the SSL message may be decrypted using at least the session key. In one embodiment, the decrypted payload may be modified, and then the modified payload may be encrypted using the session key. The encrypted modified payload may then be provided over the SSL connection as another SSL message.

In one embodiment, at least a portion of the decrypted payload may be transposed and provided over the SSL connection within another SSL message. For example, the decrypted payload within the SSL message may be transposed by being compressed, for later de-compression at the TMD, at a server, or the like.

In one embodiment, the proxy may also terminate the established SSL session at the proxy to access the SSL message. In other words, the proxy may be established as an endpoint for the SSL session. Termination of the SSL connection may result, for example, in the SSL session being established between the client device and the proxy. Such termination may employ the same session key as the prior SSL session between the client and the TMD, in one embodiment. For example, the proxy may decrypt an SSL message received from the client device over the terminated SSL connection. The proxy may then perform an action on the received payload, and then select to send another payload, a transposed payload, or modified payload to the TMD. In one embodiment, the proxy may use a similar SSL connection between the proxy and the TMD. In another embodiment, the proxy may elect to employ a different channel, such as secured channel 106 to send the payload to the TMD. Processing next continues to block 408.

At block 408, the accessed SSL message may be tunneled between the proxy and the server device. In one embodiment, data within the SSL message may be decrypted. In one embodiment, the proxy may perform an inspection, a network optimization, or the like, based, in part, on the decrypted data. For example, the data from the SSL message may be compressed, collated, encoded, re-encrypted, or the like. In one embodiment, the re-encrypted data may be sent over a secure tunnel, or the like. Processing next continues to decision block 410.

At decision block 410, it is determined whether an SSL re-handshake request message is received. In one embodiment, the re-handshake message is received at the proxy. The SSL re-handshake request message may include a CLIENT-HELLO message and/or a HELLO-REQUEST message. In one embodiment, the client device may initiate the SSL re-handshake protocol by sending the CLIENT-HELLO. In one embodiment, the server device and/or the TMD may initiate the SSL re-handshake protocol by sending the HELLO-REQUEST message. If the SSL re-handshake request message is received, then processing continues to decision block 412. Otherwise, processing returns to a calling process for further processing.

At decision block 412, it is determined if the SSL session ID associated with the SSL connection is to be reused. For example, the CLIENT-HELLO message may include a session ID associated with the SSL session to indicate that the current SSL session is to be re-used. If the SSL session ID is to be re-used, then processing continues to block 414. Otherwise, processing loops back to block 402 where the proxy continues forwarding other SSL handshake messages between the client device and the server device. In one embodiment, the other forwarded SSL handshake messages may enable the server device to perform the SSL re-handshake protocol with the client device.

At block 414, another SSL connection and another session key is established between the client device and the server device based on the secret data. In one embodiment, the proxy may perform the SSL re-handshake protocol with the client device. In this embodiment, the proxy may generate the other session key based on the secret data obtained from a prior SSL connection. The proxy may further utilize the other session key to establish the other SSL connection. Thus, at block 414, if an SSL session is to be re-used between the client device and the server device, the secret data from the prior SSL connection is used to establish the other SSL connection between the client device and the proxy. Processing then loops back to block 404 for further processing.

Figure 5:
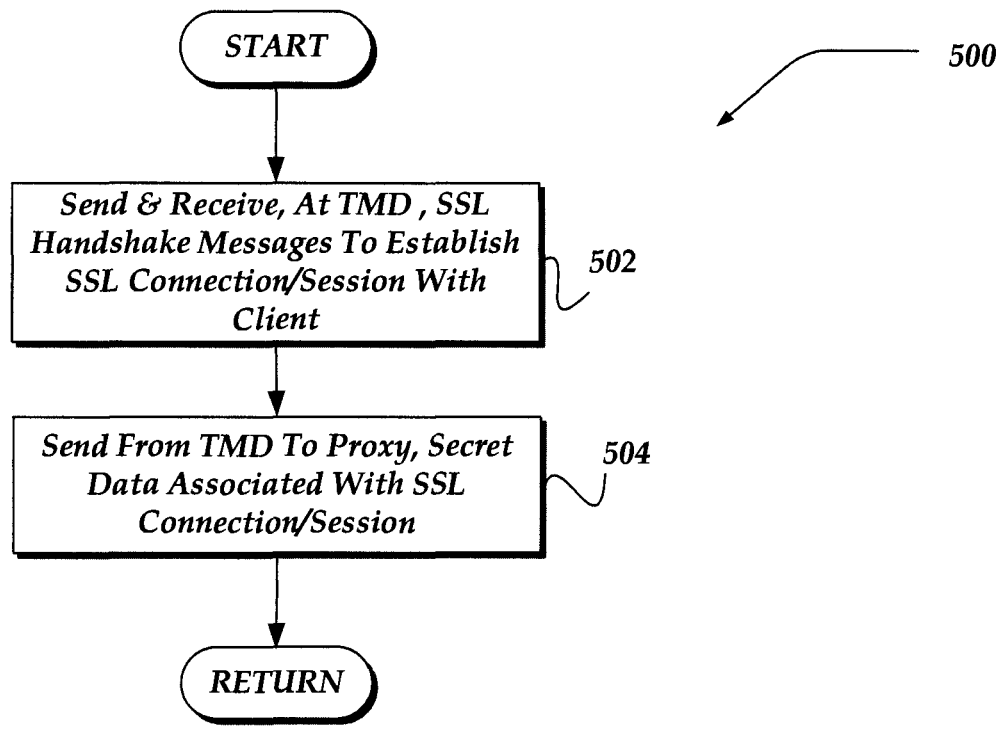
FIG. 5 illustrates a logical flow diagram generally showing one embodiment of a process for sending from a TMD to a proxy secret data to access an SSL connection.

FIG. 5 illustrates a logical flow diagram generally showing one embodiment of a process for sending from a TMD to a proxy, secret data for use in accessing data sent over the SSL connection. Process 500 of FIG. 5 may be implemented, for example, within TMD 105 of FIG. 1.

Process 500 begins, after a start block, at block 502, where the TMD sends and receives SSL handshake messages to establish the SSL connection with a client device. In one embodiment, the SSL handshake messages may include a CLIENT-HELLO, SERVER-HELLO, SERVER-CERTIFICATE, SERVER-HELLO-DONE, CLIENT-KEY-EXCHANGE, CHANGE-CIPHER-SPEC, FINISHED, or the like. Based at least on the SSL handshake messages, the TMD may establish the SSL connection with the client device by generating at least a session key that may be utilized to encrypt/decrypt data sent over the SSL connection. Processing then continues to block 504.

At block 504, the TMD may send to a proxy, secret data associated with the SSL connection. In one embodiment, block 504 may occur concurrently with block 502. In one embodiment, the TMD may generate the secret data, based at least in part on the received SSL handshake messages. For example, the TMD may receive a pre-master secret from the client device through a CLIENT-KEY-EXCHANGE message. In one embodiment, the TMD may send the pre-master secret as the secret data. In one embodiment, the TMD generates a master secret from the pre-master secret and the client's and/or TMD's randomly generated data. In one embodiment, the TMD may send the master secret as the secret data. In one embodiment, the TMD generates the session key, in part, from the master secret and may send the session key as the secret data. In one embodiment, the secret data may be sent within another SSL message (e.g. record), an SSL alert, or the like. Processing then returns to a calling process for further processing.

It will be understood that each block of a flowchart illustration need not be limited in the ordering shown in the illustration, and may be performed in any ordering, or even performed concurrently, without departing from the spirit of the invention. It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Figure 6:
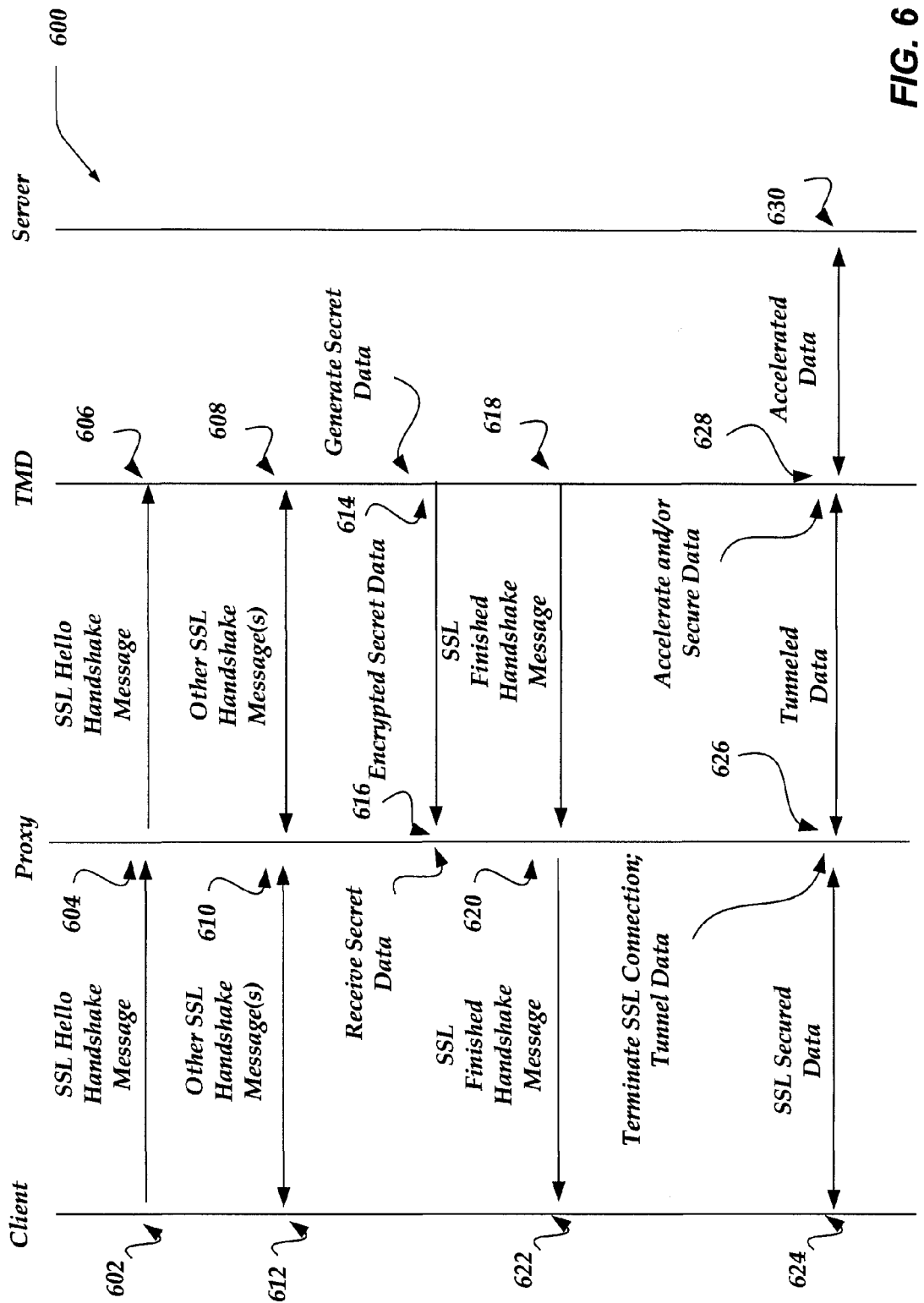
FIG. 6 illustrates a signal flow diagram generally showing one embodiment of an overview of a signal flow for remotely performing an SSL handshake.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Generalized Signal Flow FIG. 6 illustrates a signal flow diagram generally showing one embodiment of a signal flow for performing an SSL handshake to establish an SSL connection, where a proxy is enabled to access data within an SSL message over the SSL connection. Signal flow 600 of FIG. 6 may operate between a client, such as client devices 102-103, proxy 104, secure tunnel 106, traffic management device (TMD) 105, and server devices 108-109 of FIG. 1.

Signal flow 600 begins, at time 602 where a client initiates an SSL handshake by sending a CLIENT-HELLO message to the TMD. At time 604, the proxy forwards the CLIENT-HELLO to the TMD. At time 505, the TMD receives the CLIENT-HELLO and begins a server-side SSL processing based on the received SSL handshake message.

At times 608, 610, and 612, the TMD and the client sends, through the proxy, additional SSL handshake messages to establish an SSL connection, such as described above. The proxy may also forward such SSL handshake messages between the client and the TMD at time 610. The SSL handshake messages may include a SERVER-HELLO, SERVER-CERTIFICATE, SERVER-HELLO-DONE, CLIENT-KEY-EXCHANGE, CHANGE-CIPHER-SPEC, FINISHED, or the like.

While relaying the SSL handshake messages between the client and the TMD, the proxy may extract data from one or more of the SSL handshake messages. In one embodiment, the extracted data may include data randomly generated by the client, and/or the TMD.

At time 614, the TMD may generate secret data based at least on the received SSL handshake messages. The TMD may encrypt the secret data and send the secret data to the proxy for use by the proxy. Such secret data may include a master secret or a pre-master secret associated with the SSL connection. At time 616, the proxy may receive the secret data, store and/or decrypt the secret data for further processing. Moreover, the secret data may be received in an SSL handshake record, an SSL alert message, or even a message sent out-of-band of an SSL protocol associated with the SSL connection.

At time 618, the TMD may send an SSL handshake message, such as the FINISHED message, to indicate that the SSL connection is established. The proxy forwards this SSL handshake message to the client at time 620. At time 622, the client receives the SSL handshake message and establishes its SSL connection with the TMD.

At time 624, the client may send an SSL message over the established SSL connection to the TMD. The SSL message may be encrypted by the client's session key. At time 626, the proxy receives the SSL message and accesses the payload based on at least the secret data it received from the TMD. At time 626, the proxy may decrypt the payload within the SSL message and may tunnel the payload to the TMD. At time 628, the TMD may receive the tunneled payload and may forward (e.g. load balance) the payload to the server. At time 630, the server receives the decrypted SSL message. In one embodiment, while the TMD has established an SSL session with the server, the SSL message payload need not be decrypted.

As shown, signal flows at times 624, 626, 628, and 630 are bi-directional. Thus, at time 630, the server may send data to the TMD. At time 628, the data is received and tunneled to the proxy. At time 626, the proxy may encrypt the data to be sent over the SSL connection based at least on the secret data. At time 624, the client receives the data.

Illustrative Embodiment

Figure 7:
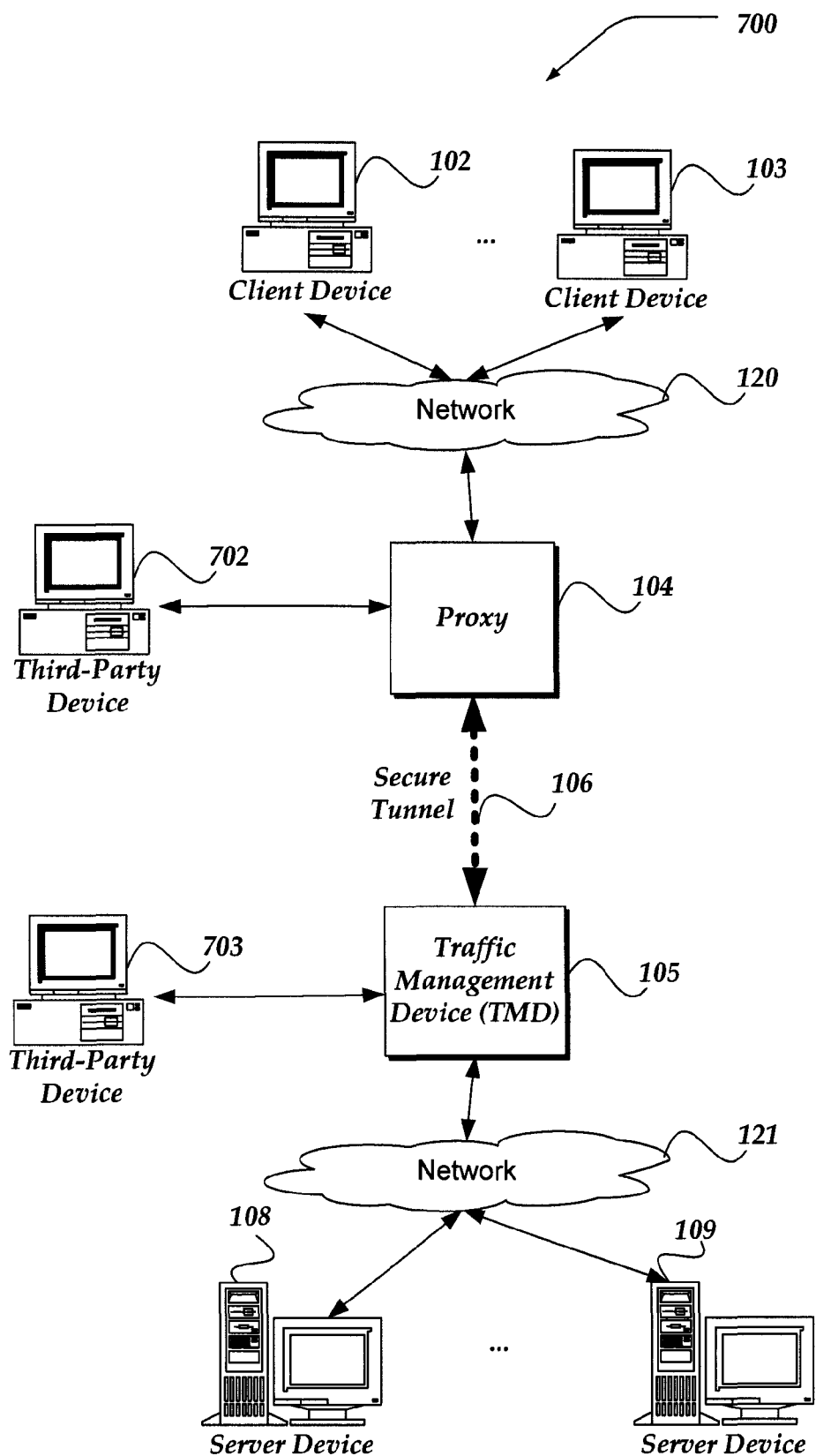
FIG. 7 shows a functional block diagram illustrating an environment including third-parties enabled to participate in a multi-way SSL connection.

Another illustrative embodiment will be described with reference to FIGS. 7-8. FIG. 7 shows a functional block diagram illustrating an environment including third-parties enabled to participate in a multi-way SSL connection. System 700 of FIG. 7 includes components substantially similar to system 100 of FIG. 1. For example client devices 102-103, network 120-121, proxy 104, secure tunnel 106, traffic management device (TMD) 105, and server devices 108-109 operate substantially similar to the corresponding components of system 100.

Additionally, system 700 includes third-party devices 702-703. As shown, third-party device 702 is in communication with proxy 104 and third-party device 703 is in communication with TMD 105. In one embodiment, third-party devices 702-703 may be in communication with proxy 104 and TMD 105, respectively, over SSL connections. Third-party devices 702-703 may include virtually any computing device capable of connecting to another computing device to send and receive information, including web requests for information from a server, or the like, over an SSL connection.

Figure 8:
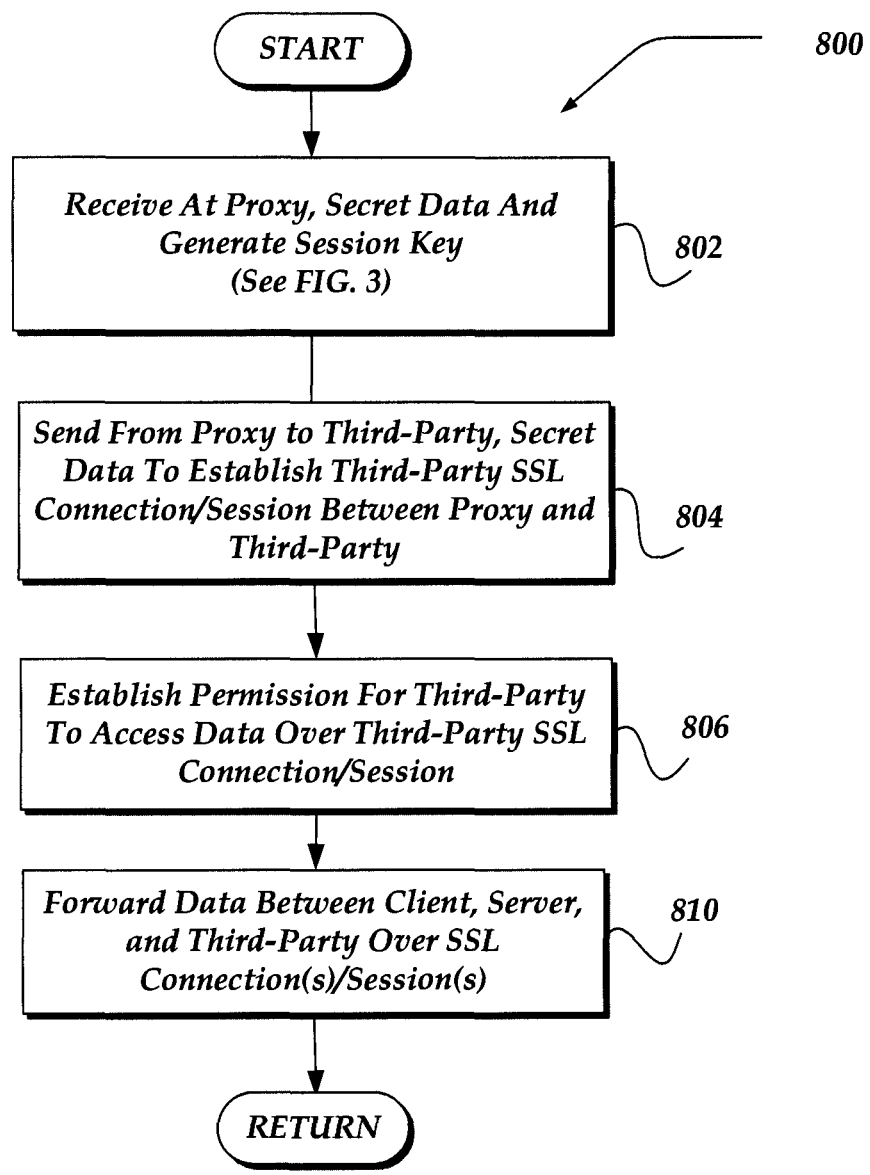
FIG. 8 illustrates a logical flow diagram generally showing one embodiment of a process for managing a multi-way SSL communication, in accordance with the invention.

Proxy 104, and TMD 105, may also perform operations illustrated in process 800 of FIG. 8. For example, proxy 104 may manage a multi-way SSL communication between client devices 102-103, third-party device 702, and TMD 105. Similarly, TMD 105 may manage a multi-way SSL communication between client devices 102-103, third-party device 703, TMD 105, and/or server devices 108-109.

FIG. 8 illustrates a logical flow diagram generally showing one embodiment of a process for managing a multi-way SSL communication with a third-party. Process 800 of FIG. 8 may be implemented, for example, within proxy 104, and/or TMD 105, of FIG. 7.

Process 800 begins, after a start block, at block 802, where secret data associated with an SSL connection is received at a proxy and a session key is generated. In one embodiment, the operations of block 802 correspond substantially to process 300 of FIG. 3. For example, an SSL connection is established between the client device and the server device; the secret data is received at the proxy; and the secret data is employed to generate a session key. Processing next continues to block 804.

At block 804, the proxy may send to a third-party, secret data to establish a third-party SSL connection between the proxy and the third-party. In one embodiment, the third-party may be a TMD, a server device, or another device. In one embodiment, the proxy may also send other information, such as the client's and the server's (or the TMD's) randomly generated data, to establish the third-party SSL connection. In one embodiment, the secret data may be encrypted based on a trust relationship between the proxy and the third-party. In one embodiment, data sent over the third-party SSL connection may be encrypted and/or decrypted based at least on the secret data. Processing then continues to block 806.

At block 806, the proxy may establish a permission for the third-party to access data communicated over the third-party SSL connection. The permission may grant the third-party full access to read, write, and/or modify the data. The permission may limit the third-party to only read data, to access data from a particular source, to access a portion of the data, or the like. Processing then continues to block 808.

At block 808, the proxy may also forward data between the client device, the server device, and the third-party, over the SSL connections. For example, data may be forwarded over an SSL connection between the client, an SSL connection with the TMD, the third-party SSL connection, or the like. In one embodiment, data sent between the client device and the server device may be encrypted based at least on the secret data and forwarded to the third-party. The SSL connection with the third-party may be terminated at the third-party based at least in part on the secret data. Processing then returns to a calling process for further processing.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing an SSL communication over a network, comprising:
    a traffic management device (TMD) operative to perform actions comprising:
        receiving an SSL handshake message from a client device;
        sending another SSL handshake message to the client device; and
        establishing an SSL session with the client device based, in part, on the SSL handshake message and other SSL handshake message, wherein the SSL session includes a single SSL session between the TMD and the client device; and
    a proxy device interposed between the client device and the TMD, the proxy operative to perform actions comprising:
        receiving the SSL handshake message from the client device, and forwarding the received SSL handshake message to the TMD;
        extracting data from at least one of the SSL handshake messages between the client device and the TMD, wherein the at least one of the SSL handshake messages is separate from an acknowledgement (ACK) message or a synchronize (SYN) message;
        receiving the other SSL handshake message from the TMD, and forwarding the received other SSL handshake message to the client device;
        receiving secret data associated with the SSL session;
        employing, in part, the secret data to generate a session key associated with the established SSL session;
        decrypting an SSL message over the SSL session based at least in part on the session key; and
        performing on the decrypted SSL message at least one of scanning, auditing, and logging.

2. The system of claim 1, wherein the secret data is sent to the proxy device for use by the proxy device by one of the client device, or the TMD.

3. The system of claim 1, the proxy device further operative to perform actions comprising:
    sending the secret data to a third-party device to establish a third-party SSL session between the proxy device and the third-party device.

4. A traffic management device (TMD) for use in communicating a secure message over a network, comprising:
    a transceiver to send and receive data over the network; and
    a processor that is operative to perform actions comprising:
        establishing at the TMD an SSL session with a first network device;
        sending from the TMD to a second network device, other than the first network device, secret data that is associated with the SSL session, wherein the secret data is both extracted from at least one of the SSL handshake messages used to establish the SSL session between the TMD and the first network device and being configured to enable the second network device to generate a session key associated with the SSL session, and wherein the at least one of the SSL handshake messages is separate from an acknowledgement (ACK) message or a synchronize (SYN) message, and wherein the TMD is further configured to load-balance messages from the first network device to at least one of a plurality of server devices;
        decrypting an SSL message over the SSL session based at least in part on a session key; and
        performing on the decrypted SSL message at least one of scanning, auditing, and logging.

5. The TMD of claim 4, wherein the second network device is a proxy device interposed between the TMD and the first network device.

6. The TMD of claim 4, wherein the secret data further comprises at least one of a master secret or a pre-master secret associated with the SSL session.

7. The TMD of claim 4, wherein the secret data is sent to the second network device over a secure channel.

8. A method for managing an SSL connection, the method comprising:
    establishing the SSL connection between a first network device and a second network device using at least one of SSL handshake messages; and
    sending to a third network device secret data that is associated with the SSL connection, wherein the secret data is both extracted from at least one of the SSL handshake messages used to establish the SSL connection between the first network device and the second network device and enables the third network device to generate a session key associated with the SSL connection, and wherein the at least one of the SSL handshake messages is an acknowledgement (ACK) message or a synchronize (SYN) message, and wherein a traffic management device (TMD) is configured to load-balance messages from the first network device to at least one of a plurality of server devices;
    decrypting an SSL message over an SSL session based at least in part on a session key; and
    performing on the decrypted SSL message at least one of scanning, auditing, and logging.

9. The method of claim 8, wherein the third network device is a proxy device interposed between the first and the second network devices.

10. The method of claim 8, wherein the secret data further comprises one of a master secret, or a pre-master secret.

11. The method of claim 8, further comprising:
    if the SSL session is to be reused between the first and the second network devices, using the secret data to establish another SSL connection between the first network device and the second network device.

12. A non-transitory computer readable storage medium configured to include program instructions for performing the method of claim 8.

* * * * *